455-609 AU 233 EX
FIP8106 XR 3,164,782

Jan. 5, 1965     F. D. ORDWAY, JR     3,164,782
GAS-FILLED ENVELOPE FOR SOLID LASER TUBE
HAVING INTERNAL ELECTRODES
Filed Jan. 31, 1963

INVENTOR
Fred D. Ordway, Jr.
BY David Robbins ATTORNEY
Alvin J. Englert AGENT 3,164,782
GAS-FILLED ENVELOPE FOR SOLID LASER TUBE
HAVING INTERNAL ELECTRODES
Fred D. Ordway, Jr., 5205 Elsmere Ave.,
Bethesda 14, Md.
Filed Jan. 31, 1963, Ser. No. 256,191
1 Claim. (Cl. 331—94.5)
(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952), section 266.

This invention relates to lasers, and more particularly to solid lasers having improved light pumping means.

The typical solid laser comprises a solid laser element such as a rod of ruby, which is pumped with light energy by means of an electronic flash lamp disposed adjacent thereto. Since the light emitted by the flash lamp travels in all directions, it is common to surround the flash lamp and ruby rod with a cylindrically-shaped reflector. Because of the losses associated with such an arrangement, however, not all of the light emitted by the gaseous discharge is available for pumping in the ruby rod.

A primary object of the present invention is to provide a solid laser element which is so arranged with respect to gas discharge means that substantially all of the emitted light is absorbed in the element. To accomplish this object, the solid laser element of the present invention is made in the form of a hollow tube. The bore of the tube is directly filled with a suitable discharge gas, whereby the emitted light is directly transmitted into the tubular laser element.

Accordingly, another object of the present invention is to provide solid lasers having tubular laser elements.

Another object is to provide tubular laser elements wherein light is generated within the bore thereof.

Still another object is to provide light pumping means within a solid laser element.

Still another object is to provide a gas discharge directly within a solid laser element.

A further object is to provide means for containing a gas filling within a tubular solid laser element.

A further object is to provide a tubular laser element with an envelope containing a gas filling.

Still a further object is to provide a gas-filled envelope surrounding a tubular laser element with means for initiating a discharge therein.

These and many other objects and attendant features of the present invention will be readily apparent from the following description which refers to the drawings, wherein.

Figure 1:
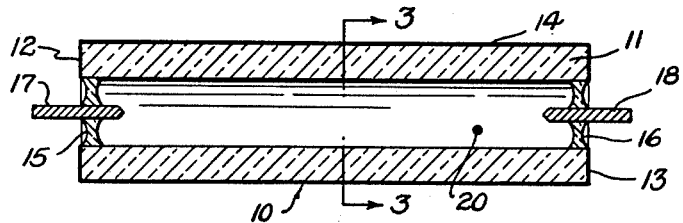
FIG. 1 is a sectional elevation view of a solid laser element and light pumping means constructed in accordance with the present invention.
Figure 2:
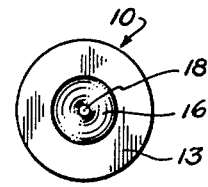
FIG. 2 is an end view of the laser of FIG. 1.
Figure 3:
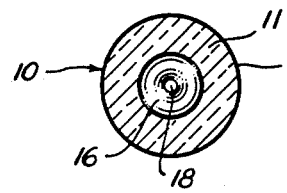
FIG. 3 is a transverse section of the laser taken on line 3—3 of FIG. 1.

The laser 10 illustrated in FIGS. 1–3 has a solid laser element that has been fabricated in the form of an elongated hollow tube 11. This laser tube 11 preferably comprises chromium-doped ruby material, although other laser materials such as uranium-doped calcium fluoride, neodymium-doped glass or the like may be used. The inner and outer surfaces of the laser tube 11 preferably are cylindrical, although they may be shaped in any convenient configuration. These surfaces are optically polished; and the end surfaces are polished and lapped to a length that is within one-quarter wavelength of a multiple number of wavelengths of the radiation characteristic of the selected material. In addition, the end surfaces are finished parallel to each other within a few seconds of arc.

The O-shaped end surfaces of the laser tube 11 are coated with reflective films 12 and 13, comprising films of silver, aluminum or the like. Film 12 is opaque, while film 13 is partially transmissive, for example, between 2% and 5% transmissive. The outer cylindrical surface of the laser tube 11 is preferably also coated with a highly-reflective, opaque film 14, although this coating may be omitted and a highly-reflecting, close-fitting, separable tube of aluminum or the like substituted therefor.

The hollow interior or bore of the laser tube 11 is sealed by means of suitable seals 15, 16 of glass or the like, through which electrodes 17, 18 extend so as to terminate in said bore. Disposed within said bore is a suitable gaseous medium, represented by the dot 20, for providing a gaseous discharge of high light intensity when conducting an electrical charge applied to the electrodes 17, 18. The gaseous medium 20 may comprise any of the gases such as xenon, argon, krypton and the like, or mixtures thereof, commonly used to fill conventional high-intensity electronic flash lamps.

It will readily be appreciated that the embodiment of the invention illustrated in FIGS. 1–3 provides highly-efficient light pumping. The light emitted by the gaseous discharge impinges directly on the laser material of tube 11, whereas in prior arrangements the light was first attenuated by passage through the glass or quartz envelope comprising the flash lamp, and further attenuated by reflections from the reflector encircling the laser rod and flash lamp.

In the laser 10 of FIGS. 1–3, the highly reflective film 14 disposed on the outer cylindrical surface of the laser tube 11 serves to reflect back into the laser material any light tending to escape therefrom. Since there is no air path between this reflecting film 14 and the laser tube 11, the losses associated with such an air space in prior arrangements are also avoided.

Figure 4:
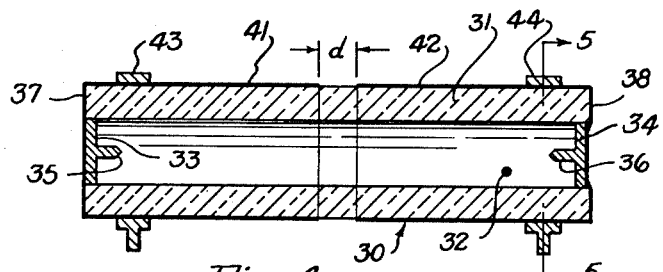
FIG. 4 is a sectional elevation view of another laser constructed according to the present invention.
Figure 5:
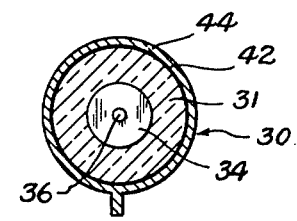
FIG. 5 is a transverse section taken on the line 5—5 of FIG. 4.

In FIGS. 4 and 5, another laser 30 constructed in accordance with the present invention is illustrated. It has a laser tube 31 similar to the laser tube 11 described previously, and the bore thereof contains a suitable gas filling 32. To seal the bore, metal discs 33, 34 having electrodes 35, 36, respectively, on one side thereof are used, and are fused to the laser tube 31 in any suitable manner. The ends of the laser tube 31 are coated with opaque and nearly-opaque reflective metal films 37, 38, respectively, as described in connection with the films 12 and 13 of FIGS. 1–3. In the embodiment of FIGS. 4 and 5 these films 37, 38 are electrically connected to the adjacent metal seals 33, 34, respectively, as by soldering, by depositing the said films on the said seals, or the like.

The outer cylindrical surface of the laser tube is coated with two highly-reflective, opaque films 41, 42. Each of these films extends less than half the length of the laser tube 31, so as to leave a gap or band of uncoated surface of length $d$ between said films 41, 42. These films 41, 42 are electrically connected to the end films 37, 38, which are in turn electrically connected to the electrodes 35, 36. Thus the two films 41, 42 provide electrical connections for the discharge of the gas 32 contained in the bore of the laser tube 31. Encircling the films 41, 42 near the ends of the laser tube 31 are contact members 43, 44, respectively, which provide convenient external leads for the application of a suitable electrical charge to the gas 32.

As will readily be appreciated, the electrical connections illustrated in FIGS. 4 and 5 provide an electrode 36 near the output end of the laser tube 31 without having an opaque lead disposed across the semi-reflective output mirror film 38. In addition, the metal seals 33, 34 may be made highly reflective so as to reflect the pumping light incident thereon back into the laser tube 31.

The gap $d$, FIG. 4, is dimensioned to provide sufficient insulation between the conductive films 41, 42 to prevent flash-over or arcing of the electrical charge applied to said films. If desired, the gap $d$ may be reduced to zero, making films 41, 42 in effect a single coating completely covering the outer cylindrical surface of the laser tube 31, in which case the metal seal 33 should be replaced with an insulative glass seal and electrode arrangement similar to that illustrated by seal 15 and electrode 17 in FIG. 1.

Figure 6:
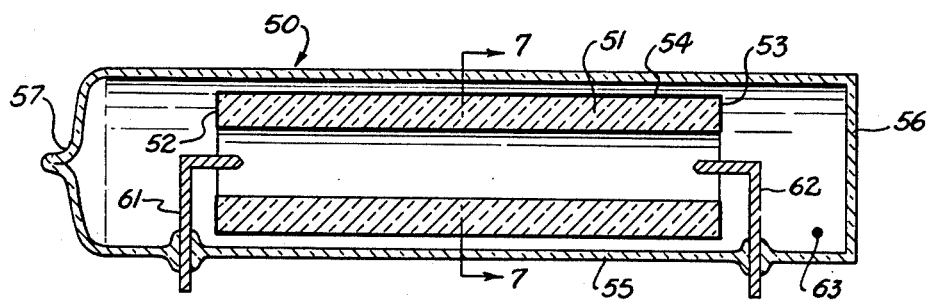
FIG. 6 is a sectional elevation view of a further laser embodying the principles of the present invention.
Figure 7:
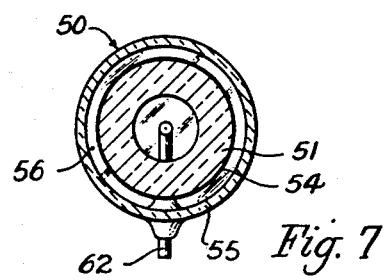
FIG. 7 is a transverse section taken on the line 7—7 of FIG. 6.

In FIGS. 6 and 7 there is illustrated another laser 50 constructed in accordance with the principles of the present invention. This laser also has a tubular laser element 51, the end surfaces of which are coated with reflective and semi-reflective films 52, 53, respectively. Disposed over the entire outer cylindrical surface of the laser tube 51 is an opaque, highly-reflective coating 54.

The laser tube 51 is concentrically arranged in a cylindrical tube 55 of a suitable transparent material such as glass, Vycor, fused quartz or the like. The ends of this tube 55 are sealed in a gas-tight manner by a transparent window 56 and a seal-off 57, both preferably of the same material as the tube 55. Introduced through and sealed to the side of the tube 55 are L-shaped electrodes 61, 62 which are arranged to terminate a short distance inside the bore of the laser tube 51. The entire interior of the envelope formed by the tube 55 and associated windows 56, 57 is filled with a suitable gas, represented by dot 63, for forming a gaseous-discharge source of pumping light, when the electrodes 61, 62 are connected to a suitable source of electrical charge.

This envelope thus provides a large reservoir of the gas 63, thereby minimizing the "clean-up" or exhaustion of gas available for discharge purposes. In this manner, the arrangement illustrated in FIG. 6 and 7 provides a laser of exceptionally long lifetime.

It is obvious that many modifications and variations of the exemplary embodiments described above will be readily apparent to those skilled in the art. Accordingly, the present invention is not intended to be limited to the precise details of construction shown and described, but is intended to cover all modifications coming within the scope of the appended claim.

What is claimed is:

In combination, a tube of solid laser material, said tube having a bore, an outer surface, and first and second substantially parallel, flat end surfaces, said first and second end surfaces having reflective and semi-reflective films, respectively, disposed thereon, said outer surface being surrounded by a reflective member, a pair of electrodes disposed in said bore, the diameters of said electrodes each being less than the diameter of said bore, a sealed envelope surrounding said tube and electrodes, said electrodes extending through said envelope, said envelope having a transparent window portion adjacent said second end surface of said tube to permit the laser beam to emerge therefrom, said envelope being filled with a gaseous medium for conducting an electrical charge applied to said electrodes to produce a luminous discharge of pumping light in said tube, the volume of said envelope being substantially larger than the volume of said bore, to provide a reservoir of said gaseous medium and thereby minimize the clean-up of said gaseous medium.

References Cited by the Examiner

UNITED STATES PATENTS

| | | | |
|---|---|---|---|
| 2,360,701 | 10/44 | MacFadden | 174—17.08 |
| 2,394,398 | 2/46 | Mouromtseff et al. | 174—50.61 |
| 2,479,600 | 8/49 | Borkowski | 174—50.57 |
| 2,929,922 | 3/60 | Schawlow et al. | 88—1 |
| 3,102,920 | 9/63 | Sirons | 88—1 |

JEWELL H. PEDERSEN, *Primary Examiner.*